US010703144B2

(12) United States Patent
Kitani

(10) Patent No.: US 10,703,144 B2
(45) Date of Patent: Jul. 7, 2020

(54) TIRE

(71) Applicant: Sumitomo Rubber Industries Ltd., Kobe-shi, Hyogo (JP)

(72) Inventor: Naofumi Kitani, Kobe (JP)

(73) Assignee: SUMITOMO RUBBER INDUSTRIES LTD., Kobe-shi, Hyogo (JP)

( * ) Notice: Subject to any disclaimer, the term of this patent is extended or adjusted under 35 U.S.C. 154(b) by 286 days.

(21) Appl. No.: 15/614,773

(22) Filed: Jun. 6, 2017

(65) Prior Publication Data

US 2017/0368886 A1 Dec. 28, 2017

(30) Foreign Application Priority Data

Jun. 24, 2016 (JP) ................................ 2016-125163

(51) Int. Cl.
*B60C 11/03* (2006.01)
*B60C 11/12* (2006.01)

(52) U.S. Cl.
CPC ...... *B60C 11/0316* (2013.01); *B60C 11/0306* (2013.01); *B60C 11/0311* (2013.01); *B60C 11/1236* (2013.01); *B60C 2011/0313* (2013.01); *B60C 2011/0346* (2013.01); *B60C 2011/0358* (2013.01); *B60C 2011/0372* (2013.01); *B60C 2011/1213* (2013.01); *B60C 2011/1245* (2013.01); *B60C 2200/06* (2013.01)

(58) Field of Classification Search
CPC ................ B60C 2011/0346; B60C 2011/1213
See application file for complete search history.

(56) References Cited

U.S. PATENT DOCUMENTS 2,454,750 A * 11/1948 Woods ................ B60C 11/0306 152/209.2
3,094,157 A * 6/1963 Friedel ................ B60C 11/0306 152/209.2

(Continued)

FOREIGN PATENT DOCUMENTS

DE 10 2012 111 116 A1 5/2014
EP 2 163 405 5/2014

(Continued)

OTHER PUBLICATIONS

Extended European Search Report dated Oct. 26, 2017, in European Patent Application No. 17170658.3.

*Primary Examiner* — Alison L Hindenlang
*Assistant Examiner* — George W. Brady
(74) *Attorney, Agent, or Firm* — Birch, Stewart, Kolasch & Birch, LLP

(57) ABSTRACT

A tire comprises a tread portion 2 provided with a first main groove 3 and a second main groove 4 each extending in a zigzag manner and a land region 10 defined between them. The land region 10 is provided with a longitudinal sipe 15 extending in a zigzag manner in the tire circumferential direction, first lug grooves 16, and second lug grooves 17. The land region 10 comprises first blocks 21 divided by the longitudinal sipe 15 and the first lug grooves 16, and second blocks 22 divided by the longitudinal sipe 15 and the second lug grooves 17. Each of the first blocks 21 and the second blocks 22 is provided with not less than three transverse sipes 25 extending across the entire width of the each of the first blocks 21 and the second blocks 22.

17 Claims, 6 Drawing Sheets

3 23 10 15 4 26 21 24 27 16 29 28 29 21 25 26 27 16 θ2 θ1 θ3 27 24 22 23 26 24 15a 17 15b 27 15c 26 15d 22 17 15

(56) References Cited

U.S. PATENT DOCUMENTS 4,462,445 A * 7/1984 Goergen ............ B60C 11/0306 152/209.18
9,162,535 B2 * 10/2015 Nagayasu .......... B60C 11/1218
2008/0066841 A1 * 3/2008 Mathews ........... B60C 11/0306 152/209.22
2008/0105349 A1 * 5/2008 Yoshida ................ B60C 11/12 152/209.25
2010/0224297 A1 * 9/2010 Kiwaki ................. B60C 11/11 152/209.23
2010/0307651 A1 * 12/2010 Castellini ........... B60C 11/0306 152/209.21
2011/0041972 A1 * 2/2011 Kageyama .......... B60C 11/0306 152/209.15
2012/0180920 A1 * 7/2012 Nagayasu .......... B60C 11/1218 152/209.21
2012/0216931 A1 * 8/2012 Shiono ............... B60C 11/0306 152/209.18
2012/0305155 A1 * 12/2012 Hamanaka ............. B60C 11/11 152/209.18
2013/0087260 A1 * 4/2013 Tobino ................... B60C 11/11 152/209.8
2013/0269846 A1 * 10/2013 Koyama ................ B60C 11/03 152/209.18
2015/0165828 A1 * 6/2015 Kaji ................... B60C 11/1281 152/209.18
2015/0202928 A1 * 7/2015 Akashi ............... B60C 11/0306 152/209.25
2015/0251500 A1 * 9/2015 Pokutta-Paskaleva ..................... B60C 11/1236 152/209.25
2015/0352903 A1 * 12/2015 Ookawa ............. B60C 11/0306 152/209.18
2016/0152091 A1 6/2016 Yoshida
2016/0297254 A1 * 10/2016 Numata ............. B60C 11/0332

FOREIGN PATENT DOCUMENTS

JP 02114004 A * 10/2004
JP 2006-160158 A 6/2006

* cited by examiner

Te
33
21
31
22
33
34
32
11
4
17
10
16
3
W1
2
12
45
TW
C
1
46
3
16
10
17
4
31
11
Te
33
34
22
21
33
32
34

4a
4
4b

TIRE

TECHNICAL FIELD

The present invention relates to a tire having excellent on-ice performance.

BACKGROUND ART

Japanese Patent Application Publication No. 2006-160158 (Patent Literature 1), for example, has proposed a tire provided with land regions divided by a pair of main grooves extending in a zigzag manner. The land regions of Patent Literature 1 are provided with longitudinal sipes extending in a zigzag manner in the tire circumferential direction and a plurality of lug grooves each connecting between one of the longitudinal sipes and one of the main grooves. The land regions are divided into a plurality of blocks by the longitudinal sipes and the plurality of the lug grooves. Each of the blocks is provided with a pair of transverse sipes extending across the entire width of the each of the blocks.

However, the tire of Patent Literature 1 has room for further improvement on traction performance on ice.

SUMMARY OF THE INVENTION

The present invention was made in view of the above, and a primary object thereof is to provide a tire having excellent on-ice performance.

In one aspect of the present invention, a tire comprises a tread portion being provided with a first main groove and a second main groove each extending continuously in a zigzag manner in the tire circumferential direction and a land region defined between the first main groove and the second main groove;

the land region being provided with a longitudinal sipe extending in a zigzag manner in the tire circumferential direction, a plurality of first lug grooves extending between the longitudinal sipe and the first main groove, and a plurality of second lug grooves extending between the longitudinal sipe and the second main groove, the land region comprising a plurality of first blocks divided by the longitudinal sipe and the plurality of the first lug grooves, and a plurality of second blocks divided by the longitudinal sipe and the plurality of the second lug grooves; and each of the first blocks and the second blocks being provided with not less than three transverse sipes extending across the entire width of the each of the first blocks and the second blocks.

In another aspect of the invention, it is preferred that the first main groove comprises a first groove portion inclined with respect to the tire circumferential direction, a second groove portion inclined to an opposite direction to the first groove portion and connected with the first groove portion, a third groove portion inclined to an opposite direction to the second groove portion and connected with the second groove portion, and a fourth groove portion inclined to an opposite direction to the third groove portion and connected with the third groove portion, and each of the first groove portion, the second groove portion, the third groove portion, and the fourth groove portion has a different angle with respect to the tire circumferential direction from each other.

In another aspect of the invention, it is preferred that the longitudinal sipe comprises a first sipe portion inclined with respect to the tire circumferential direction, a second sipe portion inclined to an opposite direction to the first sipe portion and connected with the first sipe portion, a third sipe portion inclined to an opposite direction to the second sipe portion and connected with the second sipe portion, and a fourth sipe portion inclined to an opposite direction to the third sipe portion and connected with the third sipe portion, and each of the first sipe portion, the second sipe portion, the third sipe portion, and the fourth sipe portion has a different angle with respect to the tire circumferential direction from each other.

In another aspect of the invention, it is preferred that at least one of the first lug grooves is inclined with respect to the tire axial direction, and at least one of the second lug grooves is parallel with the tire axial direction.

In another aspect of the invention, it is preferred that the second main groove extends in the zigzag manner with a same phase as the first main groove, the longitudinal sipe extends in the zigzag manner with a phase shifted by a half pitch in the tire circumferential direction from the first main groove, and each of the first blocks and the second blocks comprises a narrow portion and wide portions provided on both sides of the narrow portion in the tire circumferential direction and having widths in the tire axial direction larger than the narrow portion.

In another aspect of the invention, it is preferred that the transverse sipes include a first transverse sipe extending straight across the narrow portion and a second transverse sipe extending across the wide portion in a zigzag manner.

In another aspect of the invention, it is preferred that the first transverse sipe provided in one of the second blocks is connected smoothly with the second transverse sipe provided in one of the first blocks via the longitudinal sipe.

In another aspect of the invention, it is preferred that the second transverse sipe provided in one of the second blocks is connected smoothly with the first transverse sipe provided in one of the first blocks via the longitudinal sipe.

In another aspect of the invention, it is preferred that the first transverse sipe is inclined at an angle $\theta 1$ with respect to the tire axial direction, the second transverse sipe includes a portion inclined at an angle $\theta 2$ larger than the angle $\theta 1$ with respect to the tire axial direction, and a difference between the angle $\theta 2$ and the angle $\theta 1$ is from 10 to 30 degrees.

In another aspect of the invention, it is preferred that at least one of the first lug grooves is inclined with respect to the tire axial direction, and the first transverse Sipe is inclined to an opposite direction to the at least one of the first lug grooves.

DESCRIPTION OF THE PREFERRED EMBODIMENTS

An embodiment of the present invention will now be described in conjunction with accompanying drawings.

Figure 1:
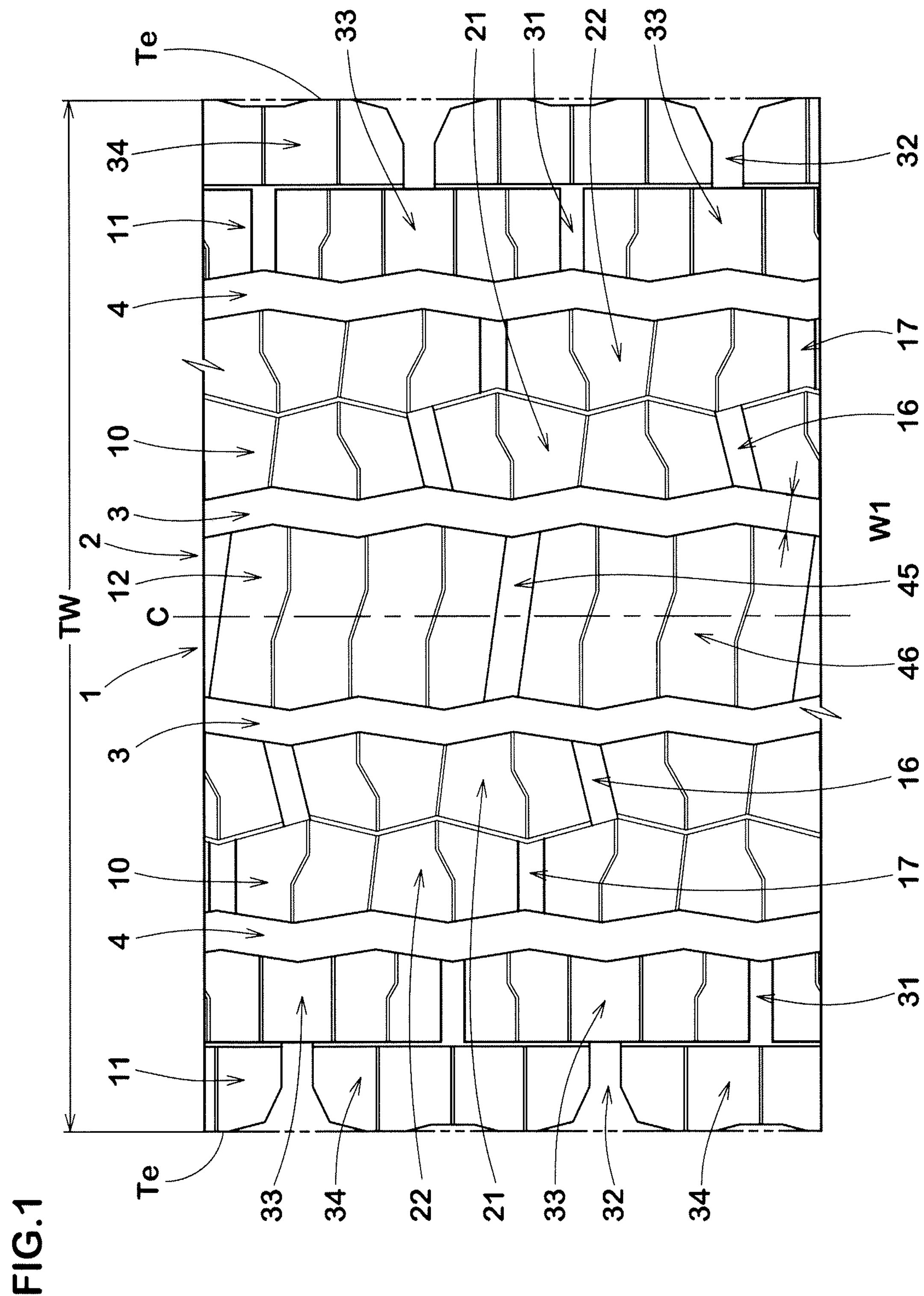
FIG. 1 is a development view of the tread portion of the tire as an embodiment of the present invention.

FIG. 1 is a development view of a tread portion 2 of a tire 1 as an embodiment of the present invention. The tire 1 of the present invention can be used for various tires such as a pneumatic tire for a passenger car or for heavy duty, and a non-pneumatic tire not filled with pressurized air inside thereof, for example. The tire 1 in this embodiment is, for example, a pneumatic tire and is suitably used as a winter tire for heavy duty.

As shown in FIG. 1, the tread portion 2 is provided with, as main grooves, first main grooves 3 and second main grooves 4 extending continuously in the tire circumferential direction in a zigzag manner.

The first main grooves 3 are provided, for example, one on each side of the tire equator C. The second main grooves 4 are provided axially outside the first main grooves 3 on each side of the tire equator C, for example. Each of the second main grooves 4 in this embodiment is provided closest to each of tread edges (Te) among the main grooves.

The "tread edges (Te)" are defined as axially outermost ground contacting positions when the tire 1 in the standard state mounted on the standard rim and inflated to the standard pressure with no tire load and then is in contact with a flat surface with zero camber angle by being loaded with a standard tire load. Sizes and the like of various parts of the tire are those measured in the standard state unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

It is preferred that a distance in the tire axial direction between the tire equator C and a groove center line of one of the first main grooves 3 is, for example, 0.05 to 0.15 times a tread width TW. It is preferred that a distance between the tire equator C and a groove center line of one of the second main grooves 4 is, for example, 0.25 to 0.35 times the tread width TW. However, the arrangement of each of the first main grooves and the second main grooves is not limited to this. The tread width TW is a distance in the tire axial direction between the tread edges (Te) in the standard state.

In order to improve the steering stability on a dry road surface and the on-ice performance in a good balance, it is preferred that a groove width W1 of each of the first main grooves 3 and the second main grooves 4 is 3 to 7% of the tread width TW, for example. From the similar point of view, in the case of a tire for heavy duty in this embodiment, it is preferred that a groove depth of each of the first main grooves 3 and the second main grooves 4 is, for example, 10.0 to 25.0 mm.

Figures 2A, 2B:
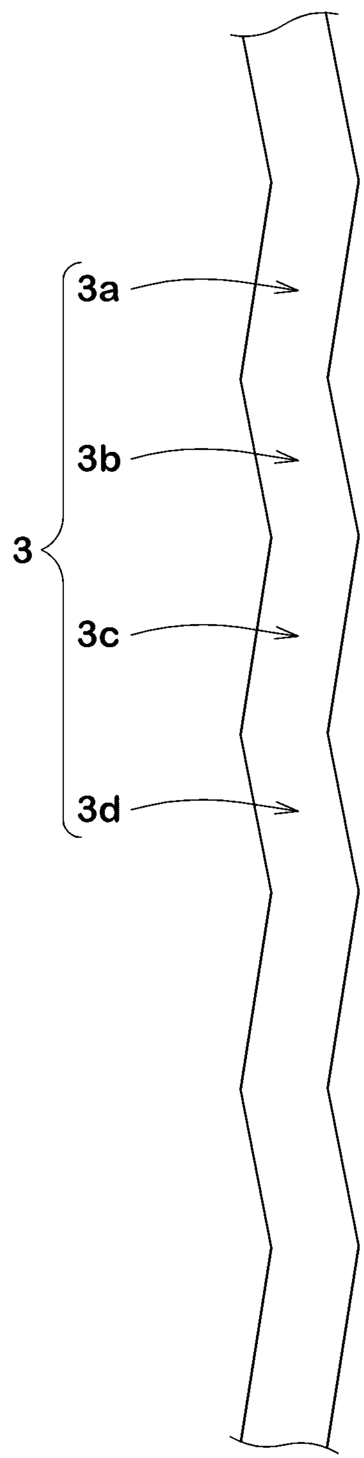
FIG. 2A is an enlarged view of an outline of the first main groove in FIG. 1.
FIG. 2B is an enlarged view of an outline of the second main groove in FIG. 1.

FIG. 2A is an enlarged view of an outline of one of the first main grooves 3. As shown in FIG. 2A, at least one, preferably each, of the first main grooves 3 includes first groove portions 3*a*, second groove portions 3*b*, third groove portions 3*c*, and fourth groove portions 3*d* which are inclined with respect to the tire circumferential direction. The second groove portions 3*b* are inclined to the opposite direction to the first groove portions 3*a* and are each connected with one of the first groove portions 3*a*. The third groove portions 3*c* are inclined to the opposite direction to the second groove portions 3*b* and are each connected with one of the second groove portions 3*b*. The fourth groove portions 3*d* are inclined to the opposite direction to the third groove portions 3*c* and are each connected with one of the third groove portions 3*c*.

Each of the first groove portions 3*a*, the second groove portions 3*b*, the third groove portions 3*c*, and the fourth groove portions 3*d* of the first main grooves 3 is inclined at an angle of 5 to 15 degrees, preferably 9 to 12 degrees with respect to the tire circumferential direction, for example. As a more preferred example, angles (absolute value) of the first groove portions 3*a*, the second groove portions 3*b*, the third groove portions 3*c*, and the fourth groove portions 3*d* in this embodiment are different from each other with respect to the tire circumferential direction. The at least one of the first main grooves 3 configured as such can exert frictional force due to edges of the at least one of the first main grooves 3 in various directions.

FIG. 2B is an enlarged view of an outline of one of the second main grooves 4. As shown in FIG. 2B, at least one, preferably each, of the second main grooves 4 extends in a zigzag manner with the same phase as the first main grooves 3, for example. The at least one of the second main grooves 4 has a configuration in which first groove portions 4*a* and second groove portions 4*b* inclined in opposite directions to each other are alternately arranged in the tire circumferential direction. The first groove portions 4*a* and the second groove portions 4*b* are inclined at an angle of 5 to 15 degrees, preferably 9 to 12 degrees with respect to the tire circumferential direction, for example. The first groove portions 4*a* and the second groove portions 4*b* of the at least one of the second main grooves 4 in this embodiment have the same angle (absolute value) with respect to the tire circumferential direction. The at least one of the second main grooves 4 configured as such is useful for having edges of each of the groove portions worn uniformly. However, the at least one of the second main grooves 4 may include four groove portions having different angles as with the at least one of the first main grooves 3, for example.

As shown in FIG. 1, the tread portion 2 is provided with middle land regions 10 each defined between one of the first main grooves 3 and one of the second main grooves 4. The tread portion 2 in this embodiment is further provided with shoulder land regions 11 each disposed axially outside each of the second main grooves 4 and a crown land region 12 defined between the first main grooves 3.

Figure 3:
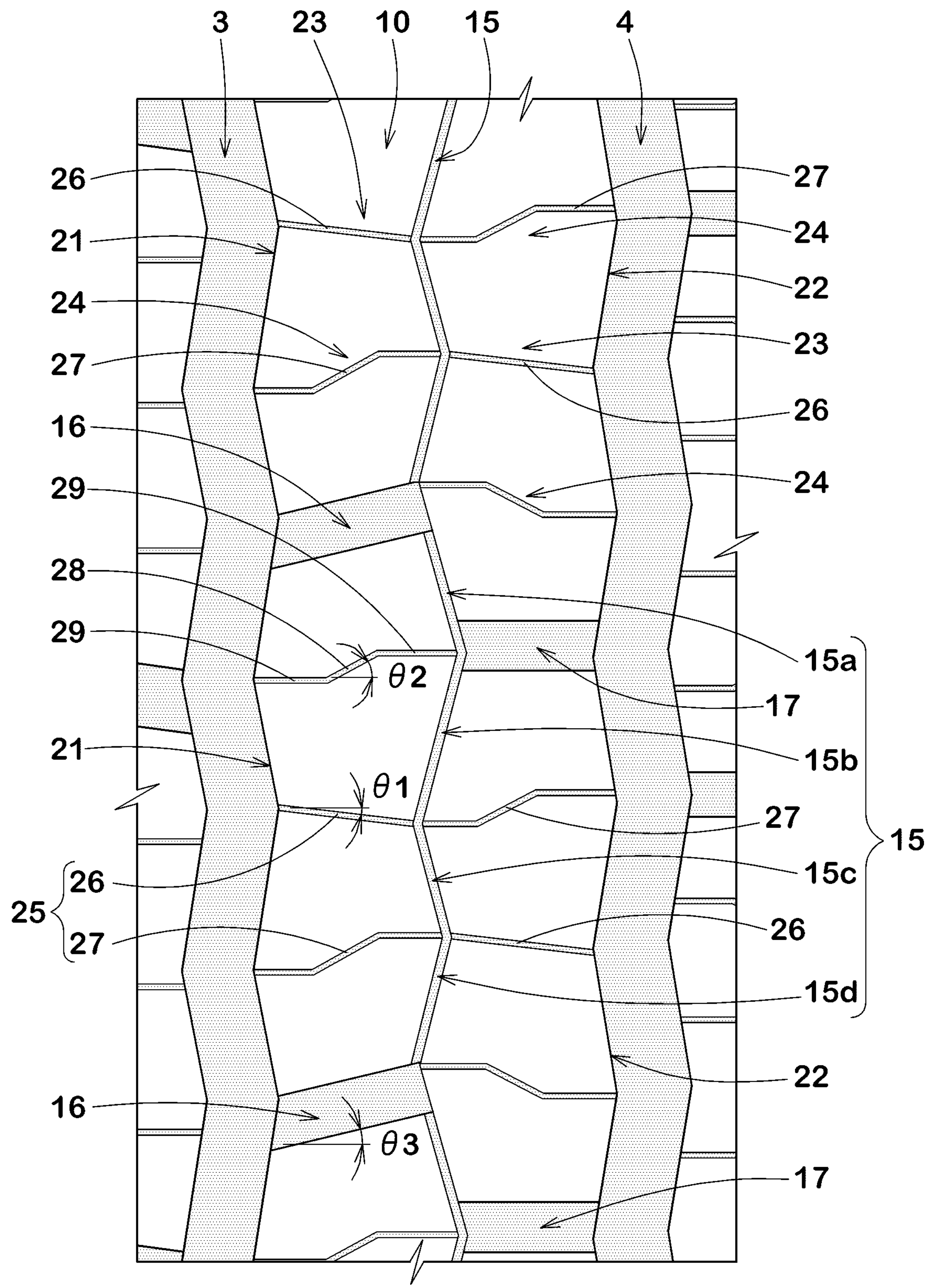
FIG. 3 is an enlarged view of a middle land region in FIG. 1.

FIG. 3 is an enlarged view of one of the middle land regions 10. In FIG. 3, the grooves and sipes are light-grayed for the convenience of easy understanding of the present invention. As shown in FIG. 3, at least one, preferably each, of the middle land regions 10 is provided with a longitudinal sipe 15, a plurality of first lug grooves 16, and a plurality of second lug grooves 17. Note that in this specification, "sipe" means a notch having a width not greater than 1.5 mm, and it is distinguished from a groove for drainage having a width larger than that.

The longitudinal sipe 15 extends in a zigzag manner in the tire circumferential direction. The longitudinal sipe 15 in this embodiment extends in a zigzag manner with a phase shifted by a half pitch in the tire circumferential direction from its adjacent one of the first main grooves 3, for example. In other words, the longitudinal sipe 15 and its adjacent one of the first main grooves 3 are arranged such that oblique elements in opposite directions are adjacent to each other in the tire axial direction.

The longitudinal sipe 15 is provided, for example, in the axial center of or in the vicinity of the axial center of the at least one of the middle land regions 10. It is preferred that a distance in the tire axial direction between the longitudinal sipe 15 and the edges of its adjacent one of the first main grooves 3 in this embodiment is 0.3 to 0.7 times a width of the at least one of the middle land regions in the tire axial direction, for example.

The longitudinal sipe 15 includes first sipe portions 15*a*, second sipe portions 15*b*, third sipe portions 15*c*, and fourth sipe portions 15*d* inclined with respect to the tire circumferential direction, for example. The second sipe portions 15*b* are inclined to an opposite direction to the first sipe portions 15*a* and each connected with one of the first sipe portions 15*a*. The third sipe portions 15*c* are inclined to an opposite direction to the second sipe portions 15*b* and each connected with one of the second sipe portions 15*b*. The fourth sipe portions 15*d* are inclined to an opposite direction to the third sipe portions 15*c* and each connected with one of the third sipe portions 15*c*.

Each of the first sipe portions 15*a*, the second sipe portions 15*b*, the third sipe portions 15*c*, and the fourth sipe portions 15*d* of the longitudinal sipe 15 is inclined at an angle (absolute value) larger than each of the first groove portions 3*a*, the second groove portions 3*b*, the third groove portions 3*c*, and the fourth groove portions 3*d* of the at least one of the first main grooves 3 with respect to the tire circumferential direction, for example. Each of the first sipe portions 15*a*, the second sipe portions 15*b*, the third sipe portions 15*c*, and the fourth sipe portions 15*d* is inclined at an angle of 10 to 20 degrees, preferably 13 to 17 degrees with respect to the tire circumferential direction, for example. As a more preferable example, the first sipe portions 15*a*, the second sipe portions 15*b*, the third sipe portions 15*c*, and the fourth sipe portions 15*d* in this embodiment have different angles (absolute value) from each other with respect to the tire circumferential direction. The longitudinal sipe 15 configured as such can exert frictional force due to its edges in various directions.

The first lug grooves 16 extend between the longitudinal sipe 15 and its adjacent one of the first main grooves 3. At least one, preferably each, of the first lug grooves 16 is inclined at an angle θ3 with respect to the tire axial direction, for example.

The second lug grooves 17 extend between the longitudinal sipe 15 and its adjacent one of the second main grooves 4. The second lug grooves 17 are provided at different positions in the tire circumferential direction with respect to the first lug grooves 16, for example. It is preferred that the second lug grooves 17 are inclined at an angle smaller than the first lug grooves 16 with respect to the tire axial direction, and at least one, preferably each, of the second lug grooves in this embodiment is parallel with the tire axial direction, for example.

Each of the first main grooves 3, the second main grooves 4, and the longitudinal sipe 15 in the zigzag shape described above includes edges extending in multiple directions, therefore, frictional force is provided not only in the tire axial direction but also in multiple directions, and consequently, the running performance on ice is improved. Further each of the first lug grooves 16 and the second lug grooves 17 provides frictional force in the tire circumferential direction, therefore, it is helpful to improve the traction performance on ice.

At least one, preferably each, of the middle land regions 10 includes a plurality of first blocks 21 divided by the longitudinal sipe 15 and the plurality of the first lug grooves 16 and a plurality of second blocks 22 divided by the longitudinal sipe 15 and the plurality of the second lug grooves.

The first blocks 21 and the second blocks 22 in this embodiment each include narrow portions 23 having small widths and wide portions 24 having large widths according to the arrangement of the at least one of the first main grooves 3, the at least one of the second main grooves 4, and the longitudinal sipe 15 described above. The narrow portions 23 are provided in a center portion in the tire circumferential direction and both end portions in the tire circumferential direction of each of the first blocks and the second blocks, for example. The wide portions 24 are each provided on both sides of each of the narrow portions 23 in the tire circumferential direction and have larger widths in the tire axial direction than the narrow portions 23. Thereby, the narrow portions 23 and the wide portions 24 are arranged alternately in the tire circumferential direction. The first blocks 21 and the second blocks 22 configured as such are deformed so that the widths of the wide portions 24 is further expanded when stress in the tire circumferential direction is applied to them. Such deformation is helpful in discharging snow in the main grooves during running on snow.

Each of the first blocks 21 and the second blocks 22 is provided with not less than three transverse sipes 25 extending across the entire width of the each of the first blocks 21 and the second blocks 22. Thereby, sufficient edge components are obtained by the transverse sipes 25, therefore, the traction performance on ice is further improved.

The transverse sipes 25 include, for example, first transverse sipes 26 each extending across one of the narrow portions 23 disposed in the center portions of the blocks and second transverse sipes 27 each extending across one of the wide portions 24.

It is preferred that each of the first transverse sipes 26 provided in the second blocks 22 is disposed so that it is smoothly connected via the longitudinal sipe 15 with one of the second transverse sipes 27 provided in the first blocks 21, for example. Further, it is preferred that each of the second transverse sipes 27 provided in the second blocks 22 is disposed so that it is smoothly connected via the longitudinal sipe 15 with one of the first transverse sipes 26 provided in the first blocks 21, for example. Thereby, the longitudinal sipe 15 and the first transverse sipes 26 and the second transverse sipes 27 cooperate with each other to exert high water absorbency, therefore, the on-ice performance is improved.

At least one, preferably each, of the first transverse sipes 26 extends straight and obliquely with respect to the tire axial direction, for example. It is preferred that an angle θ1 of the at least one of the first transverse sipes 26 with respect to the tire axial direction is smaller than the angle θ3 of the at least one of the first lug grooves 16 with respect to the tire axial direction, for example. Specifically, it is preferred that the angle θ1 of the at least one of the first transverse sipes 26 is 5 to 10 degrees. The first transverse sipes 26 configured as such can provide large frictional force in the tire circumferential direction due to the edges during running on ice.

The second transverse sipes 27 extend in a zigzag manner, for example. It is preferred that at least one, preferably each, of the second transverse sipes 27 includes a center portion 28 inclined at an angle θ2 larger than the angle θ1 with respect to the tire axial direction. The wide portions 24 provided with the second transverse sipes 27 configured as such are more likely to be deformed than the narrow portions 23 provided with the first transverse sipes 26 described above, therefore, the snow in the main grooves can be further discharged during running on snow.

It is preferred that the angle θ2 is 25 to 35 degrees, for example. The difference between the angle θ2 and the angle θ1 is preferably 10 to 30 degrees, more preferably 15 to 25 degrees. Thereby, a moderate rigidity difference is imparted between the narrow portions 23 and the wide portions 24, therefore, the above-described effects are exerted while uneven wear of the blocks is suppressed.

It is preferred that each of the second transverse sipes 27 includes outer portions 29 extending in the tire axial direction on both sides of the center portion 28, for example. The second transverse sipes 27 configured as such helps to improve the traction on ice.

Figure 4:
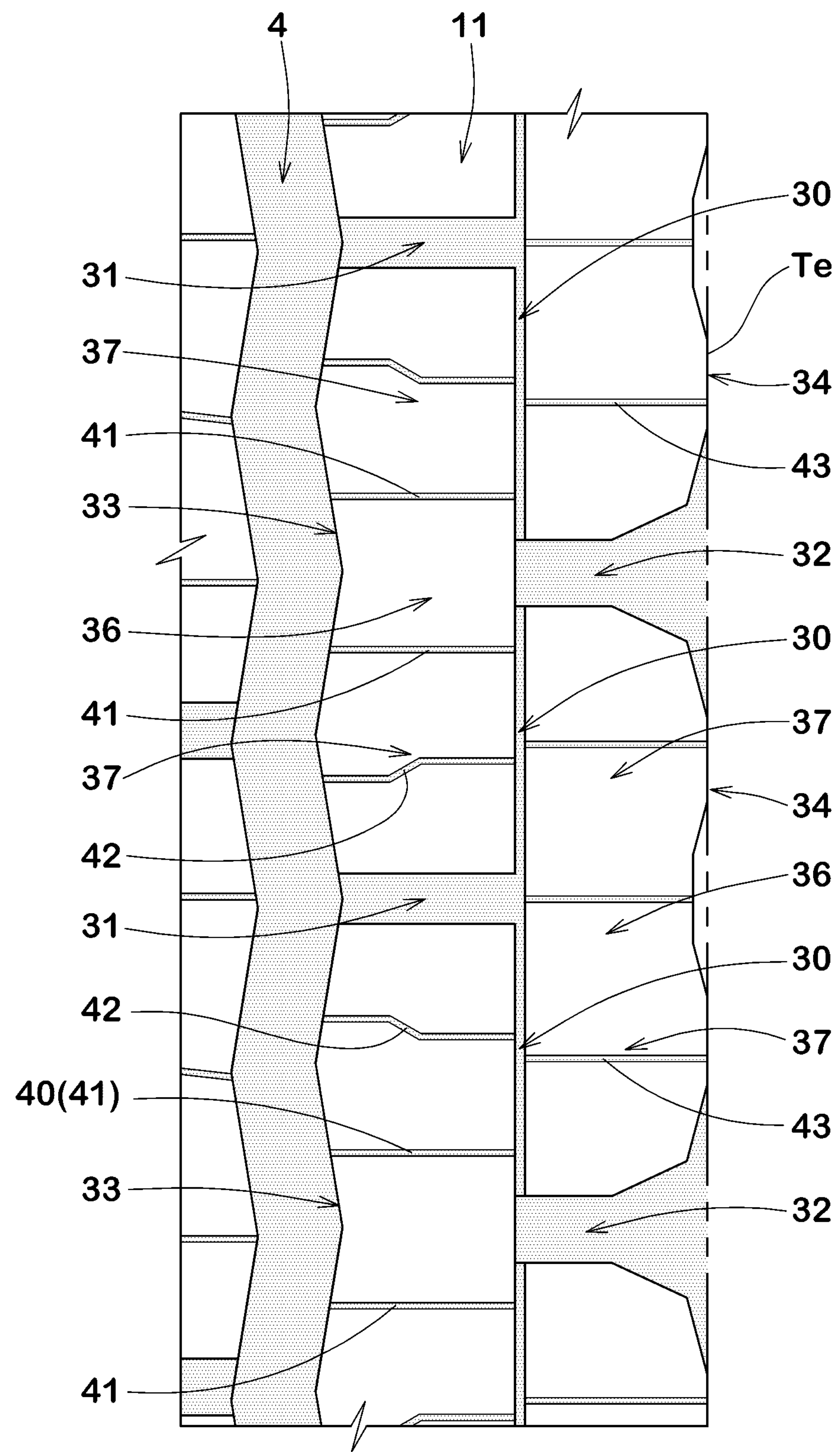
FIG. 4 is an enlarged view of a shoulder land region in FIG. 1.

FIG. 4 is an enlarged view of one of the shoulder land regions 11. As shown in FIG. 4, at least one, preferably each, of the shoulder land regions 11 is provided with a shoulder longitudinal sipe 30, a plurality of first shoulder lug grooves 31, and a plurality of second shoulder lug grooves 32, for example.

The shoulder longitudinal sipe 30 is provided, for example, in the axial center of or in the vicinity of the axial center of the at least one of the shoulder land regions 11. A distance in the tire axial direction between the shoulder longitudinal sipe 30 and edges of its adjacent one of the second main grooves 4 is 0.3 to 0.7 times a width of the at least one of the shoulder land regions 11, for example. It is preferred that the shoulder longitudinal sipe 30 extends straight in the tire circumferential direction, for example.

The first shoulder lug grooves 31 each extend between the shoulder longitudinal sipe 30 and its adjacent one of the second main grooves 4. It is preferred that the first shoulder lug grooves 31 extend straight with constant groove widths, for example. The first shoulder lug grooves 31 in this embodiment extend in parallel with the tire axial direction.

The second shoulder lug grooves 32 extend between the shoulder longitudinal sipe 30 and its adjacent one of the tread edges (Te). The second shoulder lug grooves 32 are provided at different positions in the tire circumferential direction from the first shoulder lug grooves 31, for example.

It is preferred that groove widths of the second shoulder lug grooves 32 gradually increase toward adjacent one of the tread edges (Te), for example. The second shoulder lug grooves 32 configured as such can improve the wandering performance on snow.

The at least one of the shoulder land regions 11 is provided with a plurality of first shoulder blocks 33 divided by the shoulder longitudinal sipe 30 and the plurality of the first shoulder lug grooves 31, and a plurality of second shoulder blocks 34 divided by the shoulder longitudinal sipe 30 and the plurality of the second shoulder lug grooves 32, for example.

Each of the first shoulder blocks 33 and the second shoulder blocks 34 in this embodiment includes narrow portions 36 having small widths and wide portions 37 having large widths. The narrow portions 36 are provided in a center portion in the tire circumferential direction of the each of the first shoulder blocks 33 and the second shoulder blocks 34, and end portions in the tire circumferential direction of the each of the first shoulder blocks 33 and the second shoulder blocks 34, for example. In each of the first shoulder blocks 33 and the second shoulder blocks 34, the wide portions 37 are provided on both sides in the tire circumferential direction of the narrow portion 36 disposed at the center portion, and the wide portions 37 have larger widths in the tire axial direction than the narrow portions 36. Thereby, the narrow portions 36 and the wide portions 37 are arranged alternately in the tire circumferential direction.

At least one, preferably each of the first shoulder blocks 33 and the second shoulder blocks 34 is provided with not less than three shoulder transverse sipes 40 extending across the entire width of the at least one of the first shoulder blocks 33 and the second shoulder blocks 34. Thereby, sufficient edge components are obtained by the shoulder transverse sipes 40, therefore, the traction performance on ice is further improved.

At least one, preferably each, of the first shoulder blocks 33 is provided with first shoulder transverse sipes 41 extending straight and second shoulder transverse sipes 42 extending in a zigzag manner, for example. It is preferred that a pair of the first shoulder transverse sipes 41 are provided in the at least one of the first shoulder blocks 33 so as to sandwich the narrow portion 36 disposed in the center portion of the at least one of the first shoulder blocks 33 between them, for example. It is preferred that each of the second shoulder transverse sipes 42 is provided between one of the wide portions 37 and its adjacent one of the first shoulder lug grooves 31, for example.

At least one, preferably each, of the second shoulder blocks 34 is provided with third shoulder transverse sipes 43 extending straight, for example. It is preferred that the third shoulder transverse sipes 43 are provided one in each of the wide portions 37 and one in the narrow portion 36 between the wide portions 37 of the at least one of the second shoulder blocks 34, for example.

As described above, the first shoulder transverse sipes 41 and the second shoulder transverse sipes 42 in this embodiment are arranged in the first shoulder blocks 33 so as to be displaced from the narrow portions 36 and the wide portions 37 respectively, and the third shoulder transverse sipes 43 are arranged in the narrow portions 36 and the wide portions 37 of the second shoulder blocks 34. Such arrangement of the sipes suppresses the deformation of the first shoulder blocks 33 and therefore ensures the steering stability. On the other hand, such arrangement of the sipes makes the second shoulder blocks 34 more likely to deform, therefore, it can be expected that the wandering performance is improved.

Figure 5:
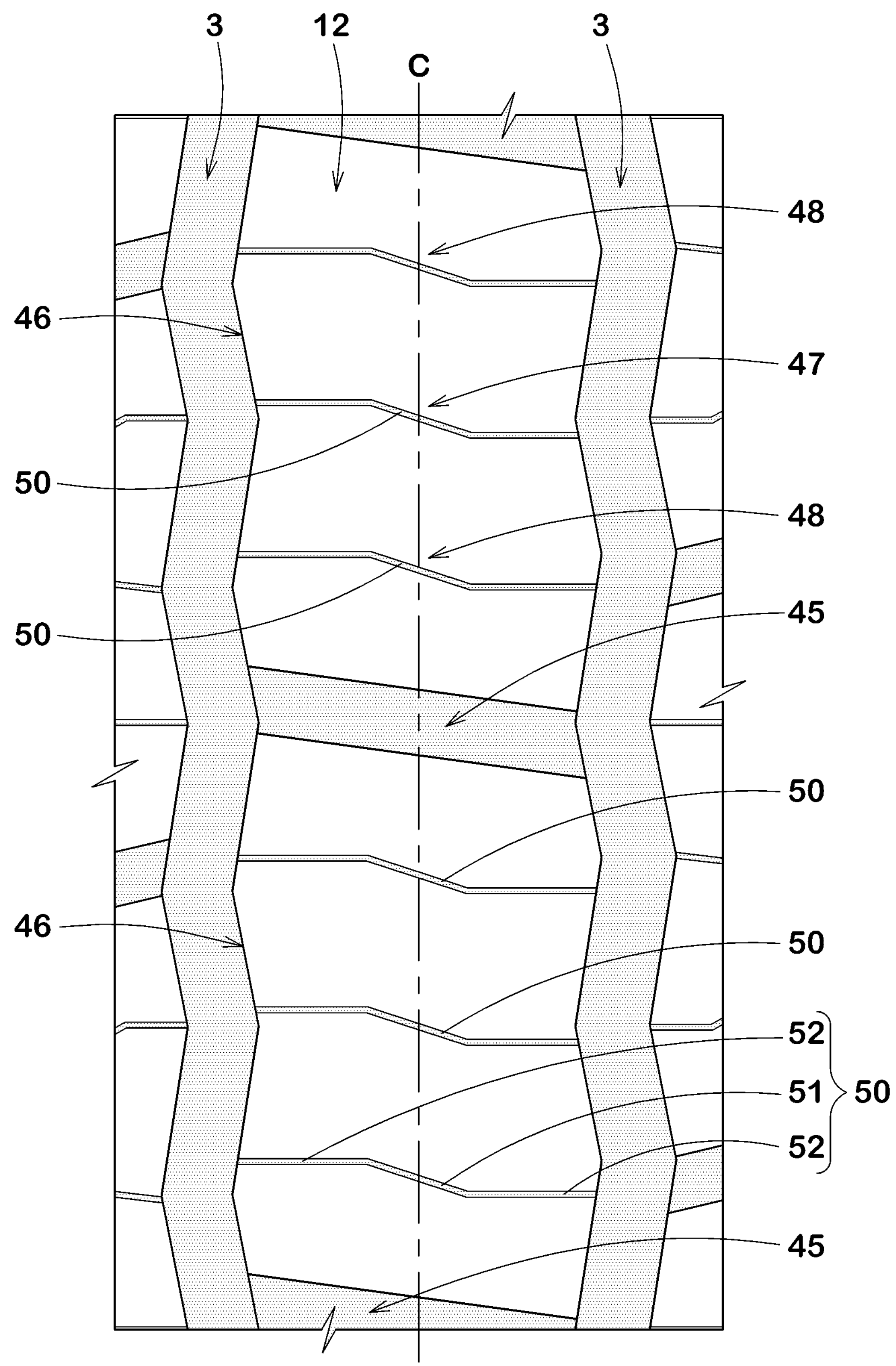
FIG. 5 is an enlarged view of a crown land region in FIG. 1.

FIG. 5 is an enlarged view of the crown land region 12. As shown in FIG. 5, the crown land region 12 is provided with a plurality of crown transverse grooves 45, for example.

The crown transverse grooves 45 are provided in every two pitches of the zigzag-shaped first main grooves 3, for example. The crown transverse grooves 45 extend obliquely with respect to the tire axial direction, for example. It is preferred that the crown transverse grooves 45 are inclined to the opposite direction to the first lug grooves 16 (shown in FIG. 3) provided in the middle land regions 10 as a preferred example. The crown transverse grooves 45 configured as such provide frictional force in various directions, therefore, the traction performance during cornering can be improved.

The crown land region 12 includes a plurality of crown blocks 46 divided by the plurality of the crown transverse grooves 45, for example.

The crown blocks 46 each include narrow portions 47 having small widths and wide portions 48 having large widths, for example. The narrow portions 47 are disposed in a center portion and both end portions in the tire circumferential direction of each of the crown blocks 46, for example. The wide portions 48 are provided on both sides in the tire circumferential direction of the narrow portions 47 disposed in the center portion of each of the crown blocks 46 and have larger widths in the tire axial direction than the narrow portions 47. Thereby, the narrow portions 47 and the wide portions 48 are arranged alternately in the tire circumferential direction.

It is preferred that each of the crown blocks 46 is provided with not less than three crown transverse sipes 50 extending across the entire width of the each of the crown blocks 46, for example. Thereby, sufficient edge components are obtained by the crown transverse sipes 50, therefore, the traction performance on ice is further improved.

It is preferred that the crown transverse sipes 50 are provided in each of the narrow portions 47 and the wide portions 48, for example. On the other hand, it is preferred that each of the crown transverse sipes 50 is displaced from the apexes of the zigzag shape of each of the first main grooves 3 in the tire circumferential direction, for example. Thereby, the concentration of stress on a connecting portion between the crown transverse sipes 50 and the first main grooves 3 is suppressed, therefore, uneven wear of the crown blocks 46 is suppressed.

At least one, preferably each, of the crown transverse sipes 50 extends in a zigzag manner, for example. At least one, preferably each, of the crown transverse sipes 50 in this embodiment includes a central portion 51 obliquely crossing the tire equator C and outer portions 52 provided on both sides of the central portion 51 and extending in the tire axial direction. The at least one of the crown transverse sipes 50 configured as such can also provide frictional force in the tire axial direction by edges of the central portion 51.

The crown land region 12 in this embodiment includes wide crown blocks 46 which are not divided by a longitudinal sipe. The crown land region 12 configured as such has higher rigidity than the middle land regions 10 and the shoulder land regions 11 and therefore can exert excellent steering stability. However, the crown land region 12 may be divided by a longitudinal sipe (not shown in the FIGS) extending straight or in a zigzag manner like the middle land regions 10 or the shoulder land regions 11 described above. With the crown land region 12 configured as such, the cornering performance on ice can be expected to be further improved.

While detailed description has been made of the tire as an embodiment of the present invention, the present invention can be embodied in various forms without being limited to the illustrated embodiment.

Working Example (Example)

Figure 6:
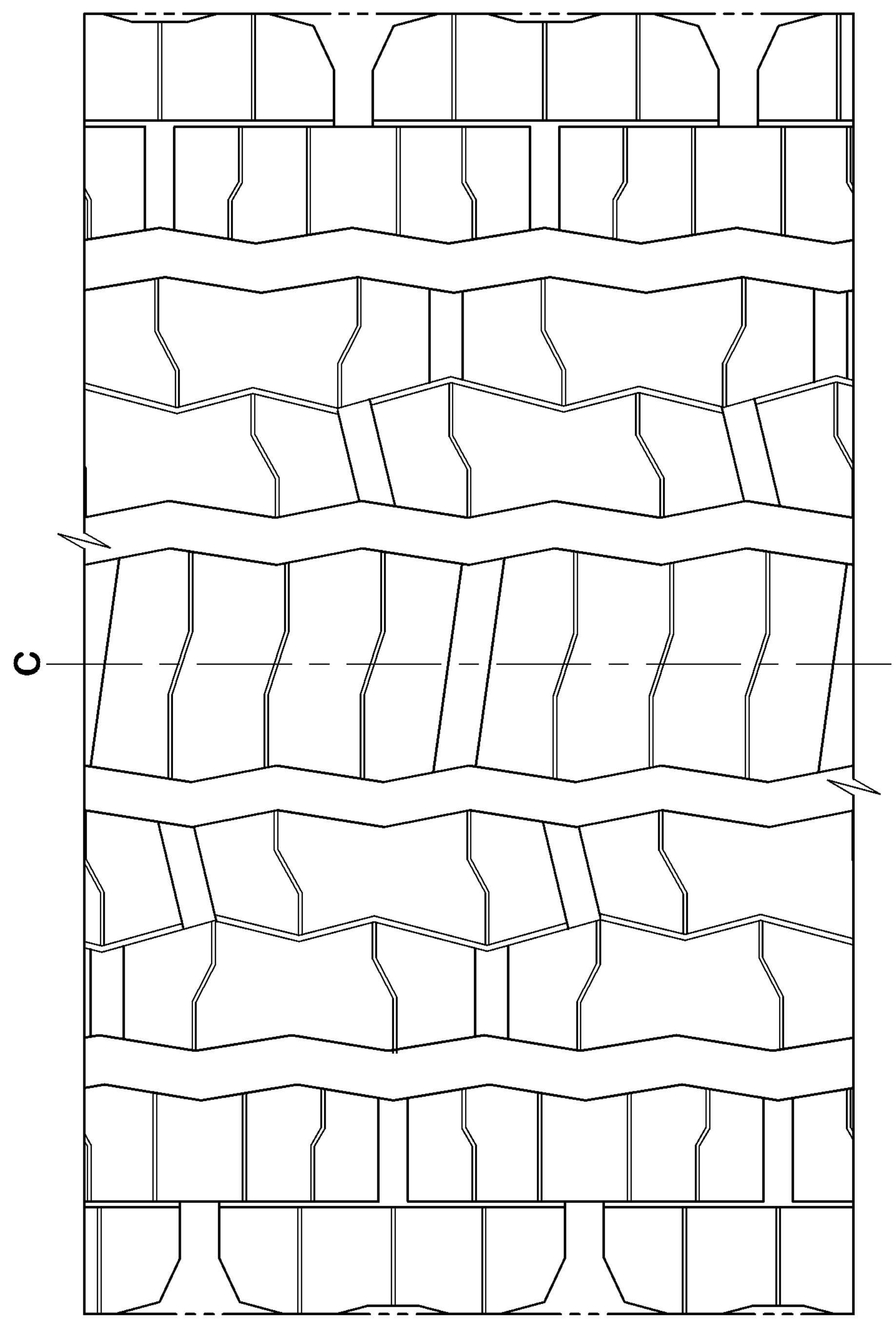
FIG. 6 is a development view of the tread portion of a tire as a comparative example (reference).

Tires of size 11R22.5 for heavy duty having the tread pattern shown in FIG. 1 were made by way of test according to the specification listed in Table 1. As a comparative example (reference), a tire was made by way of test in which each of the blocks of the middle land regions are provided with two transverse sipes as shown in FIG. 6. The test tires were each tested for the on-ice performance and the on-snow performance. Common specifications and the test methods of the test tires are as follows.

Rim: 7.50×22.5

Tire pressure: 800 kPa

Test car: 10-ton truck (2WD-car) loaded with 5-ton load

Test tire mounting position: all wheels

<On-Ice Performance and On-Snow Performance>

The time required for traveling 200 meters on S-shaped roads, composed of continuous curves with curvature radius of 30 meters, each covered with ice or with compressed snow was measured respectively. The results are indicated by an index based on the comparative example (reference) being 100, wherein the smaller the numerical value, the better the on-ice performance or the on-snow performance.

The test results are shown in Table 1.

TABLE 1

| | Ref. | Ex. 1 | Ex. 2 | Ex. 3 | Ex. 4 | Ex. 5 |
|---|---|---|---|---|---|---|
| Figure showing tread pattern | FIG. 6 | FIG. 1 | FIG. 1 | FIG. 1 | FIG. 1 | FIG. 1 |
| Angle θ1 of First transverse sipes [degree] | 6 | 6 | 10 | 10 | 8 | 5 |
| Angle θ2 of central portion of Second transverse sipe [degree] | 28 | 28 | 20 | 25 | 33 | 35 |
| Difference between Angle θ1 and Angle θ2 [degree] | 22 | 22 | 10 | 15 | 25 | 30 |
| On-snow performance [index] | 100 | 96 | 97 | 96 | 96 | 96 |
| On-ice performance [index] | 100 | 93 | 94 | 94 | 93 | 92 |

From the test results, it can be confirmed that the tires as the working examples (examples) exerted excellent on-ice performance.

The invention claimed is:

1. A tire comprising:

a tread portion being provided with a first main groove and a second main groove each extending continuously in a zigzag manner in the tire circumferential direction and a land region defined between the first main groove and the second main groove;

the land region being provided with a longitudinal sipe extending in a zigzag manner in the tire circumferential direction, a plurality of first lug grooves extending between the longitudinal sipe and the first main groove, and a plurality of second lug grooves extending between the longitudinal sipe and the second main groove, the land region comprising a plurality of first blocks defined by the longitudinal sipe and the plurality of the first lug grooves, and a plurality of second blocks defined by the longitudinal sipe and the plurality of the second lug grooves;

each of the first blocks and the second blocks being provided with not less than three transverse sipes extending across the entire width of the each of the first blocks and the second blocks:

at least one of the first lug grooves is inclined with respect to the tire axial direction at least one of the second lug grooves is parallel with the tire axial direction; and the second lug grooves are provided at different positions in the tire circumferential direction with respect to the first lug grooves such that each of the second lug grooves does not overlap in the tire circumferential direction with any one of the first grooves when viewed along a straight line in the tire axial direction;

wherein, the first main groove comprises a first groove portion inclined with respect to the tire circumferential direction, a second groove portion inclined to an opposite direction to the first groove portion and connected with the first groove portion, a third groove portion inclined to an opposite direction to the second groove portion and connected with the second groove portion, and a fourth groove portion inclined to an opposite direction to the third groove portion and connected with the third groove portion, and each of the first groove portion, the second groove portion, the third groove portion, and the fourth groove portion has a different angle with respect to the tire circumferential direction from each other;

wherein the longitudinal sipe comprises a first sipe portion inclined with respect to the tire circumferential direction, a second sipe portion inclined to an opposite direction to the first sipe portion and connected with the first sipe portion, a third sipe portion inclined to an opposite direction to the second sipe portion and connected with the second sipe portion, and a fourth sipe portion inclined to an opposite direction to the third sipe portion and connected with the third sipe portion;

wherein each of the first sipe portion, the second sipe portion, the third sipe portion, and the fourth sipe portion has a different angle with respect to the tire circumferential direction from each other: and wherein each of the first sipe portion, the second sipe portion, the third sipe portion, and the fourth sipe portion of the longitudinal sipe is inclined at an angle larger than each of the first groove portion, the second groove portion, the third groove portion, and the fourth groove portion of the first main groove with respect to the tire circumferential direction.

2. The tire according to claim 1, wherein, the second main groove extends in the zigzag manner with a same phase as the first main groove;

the longitudinal sipe extends in the zigzag manner with a phase shifted by a half pitch in the tire circumferential direction from the first main groove;

each of the first blocks and the second blocks comprises a narrow portion and wide portions provided on both sides of the narrow portion in the tire circumferential direction and having widths in the tire axial direction larger than the narrow portion;

the second lug grooves are provided at different positions in the tire circumferential direction with respect to the first lug grooves such that each of the second lug grooves does not overlap in the tire circumferential direction with any one of the first grooves when viewed along a straight line in the tire axial direction; and the first main groove, the second main groove, and the longitudinal sipe extend at the same pitch.

3. The tire according to claim 1, wherein, the second main groove extends in the zigzag manner with a same phase as the first main groove;

the longitudinal sipe extends in the zigzag manner with a phase shifted by a half pitch in the tire circumferential direction from the first main groove;

each of the first blocks and the second blocks comprises a narrow portion and wide portions provided on both sides of the narrow portion in the tire circumferential direction and having widths in the tire axial direction larger than the narrow portion;

the transverse sipes include a first transverse sipe extending straight across the narrow portion and a second transverse sipe extending across the wide portion in a zigzag manner;

the second lug grooves are provided at different positions in the tire circumferential direction with respect to the first lug grooves such that each of the second lug grooves does not overlap in the tire circumferential direction with any one of the first grooves when viewed along a straight line in the tire axial direction; and a width of each of the transverse sipes is not greater than 1.5 mm.

4. The tire according to claim 1, wherein, each of the first groove portion, the second groove portion, the third groove portion, and the fourth groove portion of the first main groove is inclined at the angle of 5 degrees or more and 15 degrees or less with respect to the tire circumferential direction.

5. The tire according to claim 1, wherein, a distance in the tire axial direction between the longitudinal sipe and an edge of the first main groove is 0.3 times or more and 0.7 times or less a width of the land region in the tire axial direction.

6. The tire according to claim 1, wherein, each of the first sipe portion, the second sipe portion, the third sipe portion, and the fourth sipe portion of the longitudinal sipe is inclined at an angle of 10 degrees or more and 20 degrees or less with respect to the tire circumferential direction.

7. The tire according to claim 1, wherein, the second main groove extends in the zigzag manner with a same phase as the first main groove, the longitudinal sipe extends in the zigzag manner with a phase shifted by a half pitch in the tire circumferential direction from the first main groove, and each of the first blocks and the second blocks comprises a narrow portion and wide portions provided on both sides of the narrow portion in the tire circumferential direction and having widths in the tire axial direction larger than the narrow portion.

8. The tire according to claim 7, wherein, the transverse sipes include a first transverse sipe extending straight across the narrow portion and a second transverse sipe extending across the wide portion in a zigzag manner, and the first transverse sipe linearly extends the entire length thereof.

9. The tire according to claim 8, wherein, the first transverse sipe provided in one of the second blocks is connected smoothly with the second transverse sipe provided in one of the first blocks via the longitudinal sipe.

10. The tire according to claim 8, wherein, the second transverse sipe provided in one of the second blocks is connected smoothly with the first transverse sipe provided in one of the first blocks via the longitudinal sipe.

11. The tire according to claim 8, wherein, the first transverse sipe is inclined at an angle θ1 with respect to the tire axial direction, the second transverse sipe includes a portion inclined at an angle θ2 larger than the angle θ1 with respect to the tire axial direction, a difference between the angle θ2 and the angle θ1 is from 10 to 30 degrees, and the second transverse sipe has only two bent portions.

12. The tire according to claim 11, wherein, the angle θ1 of the first transverse sipe is smaller than an angle θ3 of each of the first lug grooves with respect to the tire axial direction.

13. The tire according to claim 11, wherein, the angle θ1 of the first transverse sipe is 5 degrees or more and 10 degrees or less.

14. The tire according to claim 11, wherein, the difference between the angle θ2 and the angle θ1 is 15 degrees or more and 25 degrees or less.

15. The tire according to claim 11, wherein, the angle θ2 of the second transverse sipe is 25 degrees or more and 35 degrees or less.

16. The tire according to claim 11, wherein, the second transverse sipe includes outer portions extending in the tire axial direction on both sides in the tire axial direction of the portion inclined at the angle θ2.

17. The tire according to claim 8, wherein, at least one of the first lug grooves is inclined with respect to the tire axial direction, and the first transverse sipe is inclined to an opposite direction to the at least one of the first lug grooves.

* * * * *